United States Patent [19]

Bimba

[11] 4,263,841
[45] * Apr. 28, 1981

[54] FLUID POWER MOTOR WITH GUARD CYLINDER

[76] Inventor: Charles W. Bimba, 101 E. Main St., Monee, Ill. 60449

[*] Notice: The portion of the term of this patent subsequent to Nov. 13, 1996, has been disclaimed.

[21] Appl. No.: 9,439

[22] Filed: Feb. 5, 1979

[51] Int. Cl.³ .................. F16J 11/04; F01B 29/00; F01B 31/00
[52] U.S. Cl. .................................. 92/128; 92/164; 92/171
[58] Field of Search .............. 92/169, 171, 128, 164

[56] References Cited

U.S. PATENT DOCUMENTS

| | | | |
|---|---|---|---|
| 3,182,567 | 5/1965 | Shenk | 92/169 |
| 3,485,141 | 12/1969 | Ott et al. | 92/171 |
| 3,490,344 | 1/1970 | Archer et al. | 92/171 |
| 3,500,759 | 3/1970 | Potter et al. | 92/171 |
| 3,598,021 | 8/1971 | Langland | 92/169 |
| 4,073,219 | 2/1978 | Bimba | 92/171 |

*Primary Examiner*—Paul E. Maslousky
*Attorney, Agent, or Firm*—Barry L. Clark

[57] ABSTRACT

Fluid power motor construction provides for an encompassing guard tube or cylinder to be spaced around the entire cylindrical body section which accommodates the reciprocating piston member in order to preclude any harmful denting to such body section. The construction utilizes retaining rings to anchor the end caps and is especially adapted to facilitate the initial assembly of the motor and its subsequent repair while permitting the maintenance of close tolerances on the length of the piston stroke.

5 Claims, 2 Drawing Figures

FLUID POWER MOTOR WITH GUARD CYLINDER

BACKGROUND OF THE INVENTION

The invention relates to fluid power motors and particularly to motors of the type having an encompassing guard tube to protect the cylindrical body from external damage while axially fixing the end caps relative to each other. Such motors are disclosed in Bimba U.S. Pat. No. 4,073,219, the disclosure of which is incorporated by reference herein.

Fluid power cylinders convert fluid power energy into push-pull energy. They must be operated with either compressed air or liquid, and are generally known as pneumatic or hydraulic. Briefly, conventional fluid power cylinders comprise a pressure retaining tubular body section with a smooth internal wall, end cap closures, a piston with grooves and seal rings, and a piston rod which must extend through at least one end cap member of the unit. Whereas a conventional fluid power cylinder has only one tubular section, the guard type cylinder disclosed in Pat. 4,073,219 has two tubular body sections. The outer or guard tube is spaced apart from the inner pressure retaining tube and holds the end cap closures together. The space permits the outer tube, which can be made a relatively thick, inexpensive material such as aluminum, to absorb dents without affecting the thin and expensive stainless steel body cylinder. The maximum distance a piston can travel during its operation is called the stroke length and is determined by the distance between the inner faces of the end caps against which the piston abuts at the end of its travel.

The method of attachment of end caps to the outer guard tube by means of having the end portions of the guard tube internally threaded to engage with the external threading on the end caps, as disclosed in my U.S. Pat. No. 4,073,219, is both a troublesome and expensive aspect of manufacturing a guard tupe fluid power cylinder. The greatest difficulty is in obtaining the desired stroke length within acceptable tolerances. In this type of assembly, after the internal threads of the guard tube make a threaded engagement with the external threads of the ends caps, the end cap must be threaded into the guard tube until an access opening for a pipe connection is brought into alignment with a tapped opening in the end cap. In production threading there is always a variation as to where the first thread will start in relation to a reference point. Thus, in the guard tube, the first thread could start anywhere within 360° of the centerline of the access opening. The same is true with the end cap and its tapped hole. Since there are two end caps, the variation could be great. For a 20 pitch thread, the variation could be 0.050" per each end or 0.100" which would not be acceptable since it is often necessary to control the stroke length to about plus or minus 0.015".

SUMMARY

It is a principal object of this invention to provide an improved guard tube type fluid power cylinder construction which will enable such cylinders to be produced to a very close stroke tolerance.

Another object of the present invention is to provide an end cap mounting construction which has a small degree of freedom to self align slightly to accommodate side loads to which the piston rod could be subjected, thus reducing wear and increasing the life of the piston rod bushing.

It is also another object of this invention to provide a cylinder which can conform dimensionally to the National Fluid Power Association (NFPA) standards.

In a preferred construction, a pair of removable retaining rings are placed in suitable grooves located near each end of the guard tube to limit the outward axial movement of the end caps. An inner pressure tube, which is flared at both ends, is positioned in axial alignment with a thrust spring which applies axial pressure to one end of the inner tube and spreads the end caps to bear against their respective retaining rings. A pair of O-rings in grooves in the end caps provide a pressure seal for the inner tube which is easily assembled over the seals due to the tapered ends. The thrust spring accommodates manufacturing tolerances in the various parts.

Reference to the accompanying drawing and the following description will serve to better describe the present improved fluid power cylinder construction and further advantages of the same.

DESCRIPTION OF THE PREFFERED EMBODIMENT

Figure 1:
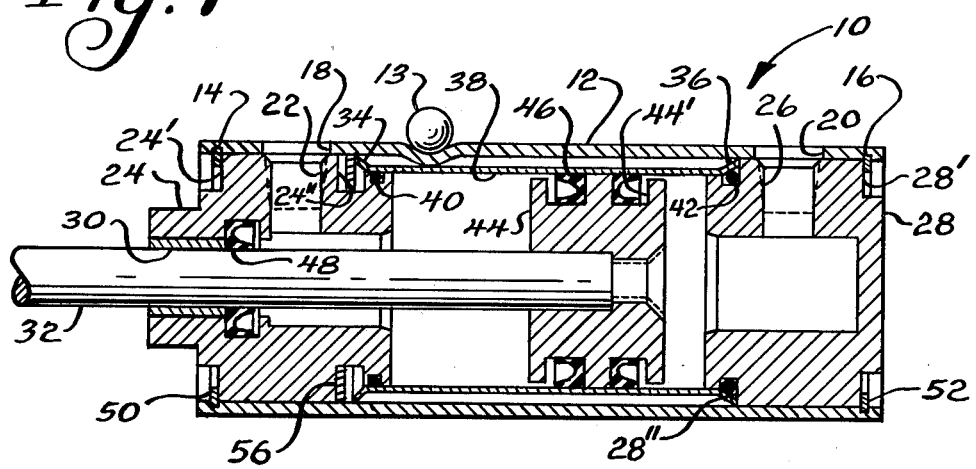
FIG. 1 is an axial sectional view illustrating a fluid power cylinder incorporating my invention.

Referring now particularly to FIG. 1 of the drawing, there is shown a fluid power cylinder 10 having an outer guard tube 12 which is spaced from an inner pressure tube 38 by a space such that the outer tube could be substantially dented by a body 13, for example, without deforming the inner tube which must be perfectly smooth and round to perform well. The guard tube contains grooves 14 and 16 and apertures 18 and 20 which provide access for threaded connections (not shown) to a tapped fluid port 22 in end cap 24 and a similar fluid port 26 in end cap 28. The end caps 24, 28 preferably have an external diameter which is about 0.003-0.008" less than the internal diameter of the guard tube 12 to enable the parts to be easily assembled to each other and to permit a slight shifting of the axis of end cap 24 and its bushing 30 to accommodate side loads which might be applied to the outer end of piston rod 32. This shifting capability greatly increases the life of the bushing 30 as compared to a construction where the end cap is threaded to the outer guard tube and thus incapable of movement relative to it. The ends 34, 36 of inner pressure tube 38 are flared outward to enable them to slide over suitable compressable pressure seals such as "O" rings 40 and 42 located in grooves in end caps 24 and 28 to facilitate assembly and prevent cutting these seals. Attached by a bolt or other means to the piston rod 32 is a reciprocating piston member 44 having grooves 44' to accommodate seal rings 46. The piston rod 32 extends axially in a slide fit through bushing 30 of end cap 24. A seal member 48 is mounted in a groove in end cap 24 so as to engage piston rod 32 and minimize leakage around the piston rod during the operation of the unit. End shoulder portions 24' and 28' of the end caps 24, 28 are engaged by retaining rings 50 and 52. These retaining rings can be but are not limited to spiral wound or split snap rings which can be reduced in diameter to fit into the grooves 14, 16. When the unit must be repaired, a spiral ring can be spiraled to a smaller diameter and removed from the groove and a snap ring can be reduced in diameter by drawing its ends together with a tool in a conventional fashion.

In machining grooves 14 and 16 in outer guard tube 12 the distance between the extreme edges of these grooves can be held to close tolerances in the neighborhood of about .005". As previously discussed, the outside diameters of end caps 24, 28 are machined to provide a slip or running fit into the inside diameter of outer guard tube 12. The end caps may thus be rotated after the rings 50, 52 are in place so that fluid port 22 will be in line with opening 18 of outer tube 12 and fluid port 26 with opening 20.

As can be seen, retaining ring 50 prevents end cap 24 from moving axially from within the confines of outer tube 12 and retaining ring 52 does the same to end cap 28. Tolerances required in manufacture dictate that the inner pressure tube 38 have a maximum length no greater than the minimum possible distance between the portions of the end caps which the tube 38 engages. When all tolerances are considered, it is obvious that in the usual situation, the tube 38 would be free to move axially to varying degrees. However, any movement is highly undesirable. To resolve the problem, thrust spring 56 such as a wave washer is positioned between the face 24" of end cap 24 and the end 34 of inner tube 38. The spring 56 transmits force through inner tube 38 and its end 36 against face 28" of end cap 28. This causes face 24' of end cap 24 to bear against retaining ring 50 and face 28' of end cap 28 to bear against retaining ring 52.

Figure 2:
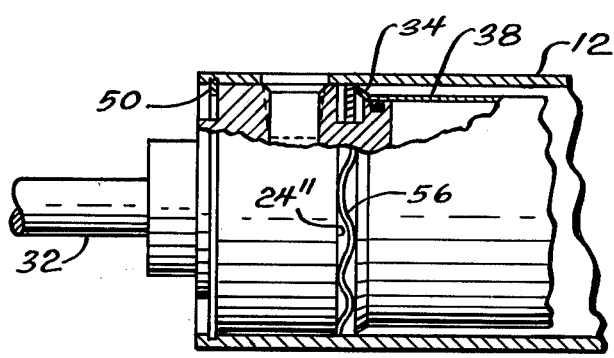
FIG. 2 is a fragmentary, partially sectioned view of the fluid power cylinder of Figure 1 showing a wave spring bearing against the edge of the inner tube.

In machining, it is practical to hold the width of the end caps and piston to a very close tolerance in the neighborhood of 0.002", the distance between the grooves to within about 0.005", and the width of the retaining rings to within about 0.002". Since the thrust spring 56 can easily accomodate such tolerances, it is obvious that the stroke length can be held to acceptable tolerances in a routine manner. The ring and groove mounting arrangement also permits the power cylinder to be constructed so that the total length of the guard tube 12 can be less, and nearer to the stroke length, than is the case with the construction disclosed in my U.S. Pat. No. 4,073,219 wherein the guard tube and end caps must have a substantial threaded length of engagement to insure adequate retention strength and to permit the relative rotation necessary to permit the fluid connection tubes to be moved through the guard tube access holes and into the tapped fluid ports. The shortened length of the guard tube permits the cylinder to conform to the length standards of the National Fluid Power Association FIG. 2 of the drawing shows a specific type of thrust spring 56 called a wave spring or wave washer and better illustrates how one side of spring 56 bears against edge 24" of end cap 24 and the opposite side against end 34 of inner tube 38.

I claim as my invention:

1. In a fluid power motor unit having a thin cylindrical body portion and end cap members to enclose and accommodate an internal reciprocating piston, separate sealing means at each end of the body portion located between the ends of the body portion and the end cap members for completely sealing the ends of said body portion to said end cap members, at least one piston rod connecting to the piston and extending through an end cap member, and fluid inlet and outlet means for introducing fluid pressure to a working chamber on at least one side of the piston in said body portion, the improved construction to preclude denting of the cylindrical body portion of the unit which comprises providing an encompassing separate guard cylinder around said body portion and spaced slightly therefrom to effect a closed air space which is out of communication with said working chamber, whereby the inner cylindrical body portion will be protected from accidental denting, said cylinder body portion forming slip-fit connections over said sealing means and portions of said end cap members, said outer guard cylinder having its end portions internally grooved and a retaining ring engaged in each of the grooves, said retaining rings bearing against axially outwardly facing shoulder portions on said end caps, said rings being removable after assembly to permit the motor unit to be disassembled for access to the piston.

2. The fluid power motor unit of claim 1 wherein an axial thrust spring is positioned between one end of said inner cylindrical body portion and one of said end cap members, said thrust spring serving to force said inner cylindrical body portion against the other of said cap members and to force each of said end cap members axially outwardly against its respective retaining ring.

3. The fluid power motor unit of claim 2 wherein at least said end cap member through which said piston rod extends has an outer diameter which is at least 0.003" less than the inner diameter of the surrounding guard tube.

4. The fluid power motor unit of claim 2 wherein said axial thrust spring is a wave spring.

5. The fluid power motor unit of claim 1 wherein said separate sealing means comprise O-rings which are compressed by said thin cylindrical body portion, the ends of said body portion being flared outwardly sufficiently to permit said body portion to move over and compress said O-rings without cutting them.

* * * * *